United States Patent
Shibutani (10) Patent No.: US 10,935,523 B2
(45) Date of Patent: Mar. 2, 2021

(54) GAS CHROMATOGRAPH

(71) Applicant: SHIMADZU CORPORATION, Kyoto (JP)

(72) Inventor: Ryuta Shibutani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 149 days.

(21) Appl. No.: 15/934,063

(22) Filed: Mar. 23, 2018

(65) Prior Publication Data

US 2018/0284078 A1    Oct. 4, 2018

(30) Foreign Application Priority Data

Mar. 31, 2017   (JP) .............................. JP2017-069524

(51) Int. Cl.
*G01N 30/30*   (2006.01)
*G01N 30/60*   (2006.01)
(Continued)

(52) U.S. Cl.
CPC ............. *G01N 30/30* (2013.01); *G01N 30/60* (2013.01); *G01N 30/64* (2013.01); *G01N 30/54* (2013.01);
(Continued)

(58) Field of Classification Search
CPC ......... G01N 30/30; G01N 30/60; G01N 30/64
(Continued)

(56) References Cited

U.S. PATENT DOCUMENTS 8,746,927 B1 *   6/2014   Nepple .................... F21L 4/005
                                                                362/147
2007/0080362 A1 *   4/2007   Scotch .................. H01L 33/641
                                                                257/99
(Continued)

FOREIGN PATENT DOCUMENTS

CN    101454909 A    6/2009
CN    103226134 A    7/2013
(Continued)

OTHER PUBLICATIONS

Okada et al., JP2013156154 (2013) english translation of specification provided by Espacenet.com, accessed Nov. 1, 2019.*

(Continued)

*Primary Examiner* — Nimeshkumar D Patel
*Assistant Examiner* — Jean F Morello
(74) *Attorney, Agent, or Firm* — Sughrue Mion, PLLC (57) ABSTRACT

In the gas chromatograph, a light source is provided in a column oven. Since a space in which the light source is disposed needs not to be secured outside the column oven, the size of the gas chromatograph can be reduced. A first connecting section in a sample introducing unit and a second connecting section in a detector are provided in an upper part in the column oven. The light source emits light toward the upper surface of the inside of the column oven (second inner casing). Therefore, light from the light source can be emitted toward the upper surface of the inside of the column oven where the first connecting section in the sample introducing unit and the second connecting section in the detector are provided and thus an operator frequently performs maintenance. Thus, work efficiency in the gas chromatograph can be improved.

10 Claims, 5 Drawing Sheets

(51) Int. Cl.
*G01N 30/64* (2006.01)
*G01N 30/54* (2006.01)
*G01N 30/02* (2006.01)

(52) U.S. Cl.
CPC ............... *G01N 2030/025* (2013.01); *G01N 2030/3084* (2013.01)

(58) Field of Classification Search
USPC ....................................................... 73/23.35
See application file for complete search history.

(56) References Cited

U.S. PATENT DOCUMENTS

| | | | |
|---|---|---|---|
| 2009/0279300 | A1 | 11/2009 | Okajima et al. |
| 2012/0307492 | A1* | 12/2012 | Ariyoshi ................. F21V 3/02 362/235 |
| 2015/0176830 | A1* | 6/2015 | Liang ..................... F21V 23/005 362/363 |

FOREIGN PATENT DOCUMENTS

| | | | | |
|---|---|---|---|---|
| CN | 204806077 U | 11/2015 | | |
| JP | 2013-156154 A | 8/2013 | | |
| JP | 2017-3153 A | 1/2017 | | |
| WO | WO-2016011612 A1 * | 1/2016 | ............ | F21V 17/101 |

OTHER PUBLICATIONS

Communication dated Apr. 21, 2020, issued by the Japan Patent Office in application No. 2017-069524.
Communication dated Nov. 15, 2019, from the China National Intellectual Property Administration in counterpart Application No. 201810230324.2 English Translation.

* cited by examiner

GAS CHROMATOGRAPH

BACKGROUND OF THE INVENTION

Field of the Invention

The present invention relates to a gas chromatograph including a light source which irradiates the inside of a column oven.

Description of the Related Art

A gas chromatograph includes an oven in which a column is accommodated. An operator can perform maintenance or the like in the oven through an opening of the oven. When an analysis is performed, the opening is closed by an opening and closing door.

In the case of performing maintenance or the like in the oven in this manner, the operator performs an operation while viewing the inside of the oven. The opening is formed at one end section of the oven, and the other end sections are closed. Thus, the inside of the oven tends to become dark, and there is a possibility that work efficiency is deteriorated. Therefore, a gas chromatograph including a light source which irradiates the inside of an oven is proposed (see, for example, JP-A-2013-156154).

In such a gas chromatograph, in a case where an operator performs an operation in the oven, work efficiency can be improved by irradiating the periphery of a spot where the operation is performed with light from a light source.

SUMMARY OF THE INVENTION

In the gas chromatograph disclosed in JP-A-2013-156154, the light source is provided outside the oven. Therefore, a space in which the light source and a member around the light source are disposed needs to be secured outside the oven, which causes a problem that the size of the gas chromatograph increases.

The present invention has been made in view of the above circumstances, and an object of the present invention is to provide a gas chromatograph capable of improving work efficiency and reducing the size of the gas chromatograph.

(1) A gas chromatograph according to the present invention includes a column oven, a sample introducing unit, a detector, and a light source. The column oven accommodates a column inside. The sample introducing unit includes a first connecting section connected to one end of the column and provided at an upper part in the column oven. The detector includes a second connecting section connected to another end of the column and provided at the upper part in the column oven. The light source is provided in the column oven and emits light to the upper surface of the inside of the column oven.

According to such a configuration, the first connecting section in the sample introducing unit and the second connecting section in the detector are provided in the upper part in the column oven. The light source emits light toward the upper surface of the inside of the column oven.

Therefore, light from the light source can be emitted toward the upper surface of the inside of the column oven where the first connecting section in the sample introducing unit and the second connecting section in the detector are provided and thus an operator frequently performs maintenance.

As a result, work efficiency in the gas chromatograph can be improved.

In addition, the light source is provided in the column oven.

Therefore, since a space in which the light source is disposed needs not to be secured outside the column oven, the size of the gas chromatograph can be reduced.

As described above, the gas chromatograph according to the present invention enables improvement of work efficiency and size reduction of the gas chromatograph.

(2) In addition, the light source may emit light toward an area between the first connecting section and the second connecting section on the upper surface of the inside of the column oven.

According to such a configuration, the first connecting section in the sample introducing unit and the second connecting section in the detector are irradiated with light from the light source in the column oven.

Therefore, work efficiency in the gas chromatograph can be further improved.

(3) In addition, the column oven may include an outer casing and a heat insulator. The outer casing has a box shape forming the outer surface of the column oven. The heat insulator is provided inside the outer casing. The light source may be provided in a space between the outer casing and the heat insulator.

According to such a configuration, the space between the outer casing and the heat insulator in the column oven can be used for disposing the light source therein.

Therefore, it is possible to suppress an increase in size of the column oven.

In addition, the light source is disposed outside the heat insulator.

Therefore, it is possible to suppress an increase in temperature of the light source due to the influence of heat inside the column oven.

(4) In the heat insulator, an opening may be formed on an optical path of light from the light source. A light-transmitting member may be provided in the opening. The light-transmitting member transmits light from the light source.

According to such a configuration, light from the light source can be transmitted through the light-transmitting member and directed to the inside of the column oven. In addition, the light-transmitting member can suppress heat exchange between the inside of the column oven and the outside of the heat insulator.

(5) In addition, the light-transmitting member may include a heat insulating member and a pair of glass plates. The heat insulating member has a through hole. The pair of glass plates sandwich the heat insulating member so as to close the through hole.

According to such a configuration, light from the light source can be transmitted through the pair of glass plates and directed to the inside of the column oven. In addition, the pair of glass plates and the heat insulating member can suppress heat exchange between the inside of the column oven and the outside of the heat insulator.

(6) In addition, the light source may include a light emitting element, a substrate, and a glass plate. The light emitting element is mounted on a mounting surface of the substrate. The glass plate is provided so as to face the mounting surface. The light emitting element may be disposed in a space formed between the substrate and the glass plate.

According to such a configuration, the space between the substrate and the glass plate can be used for disposing the light emitting element therein.

In addition, light from the light emitting element can be transmitted through the glass plate and directed to the inside of the column oven. Furthermore, the glass plate can suppress heat exchange between the area around the light emitting element and an external area.

(7) In addition, a sheet metal member may be provided between the substrate and the glass plate. The sheet metal member may be in contact with a heat transfer member provided in the column oven.

According to such a configuration, heat around the substrate can be transmitted to the heat transfer member via the sheet metal member.

Therefore, it is possible to suppress an increase in temperature of the periphery of the substrate.

(8) In addition, a through hole may be formed in the substrate. The through hole communicates with the space formed between the substrate and the glass plate.

According to such a configuration, air around the substrate can be convected via the through hole formed in the substrate.

Therefore, it is possible to further suppress an increase in temperature of the periphery of the substrate.

According to the present invention, it is possible to emit light from the light source toward the upper surface of the inside of the column oven where an operator frequently performs maintenance. Therefore, work efficiency in the gas chromatograph can be improved. In addition, the light source is provided in the column oven. Therefore, since a space in which the light source is disposed needs not to be secured outside the column oven, the size of the gas chromatograph can be reduced.

DETAILED DESCRIPTION OF THE PREFERRED EMBODIMENTS

1. Entire Configuration of Gas Chromatograph

Figure 1:
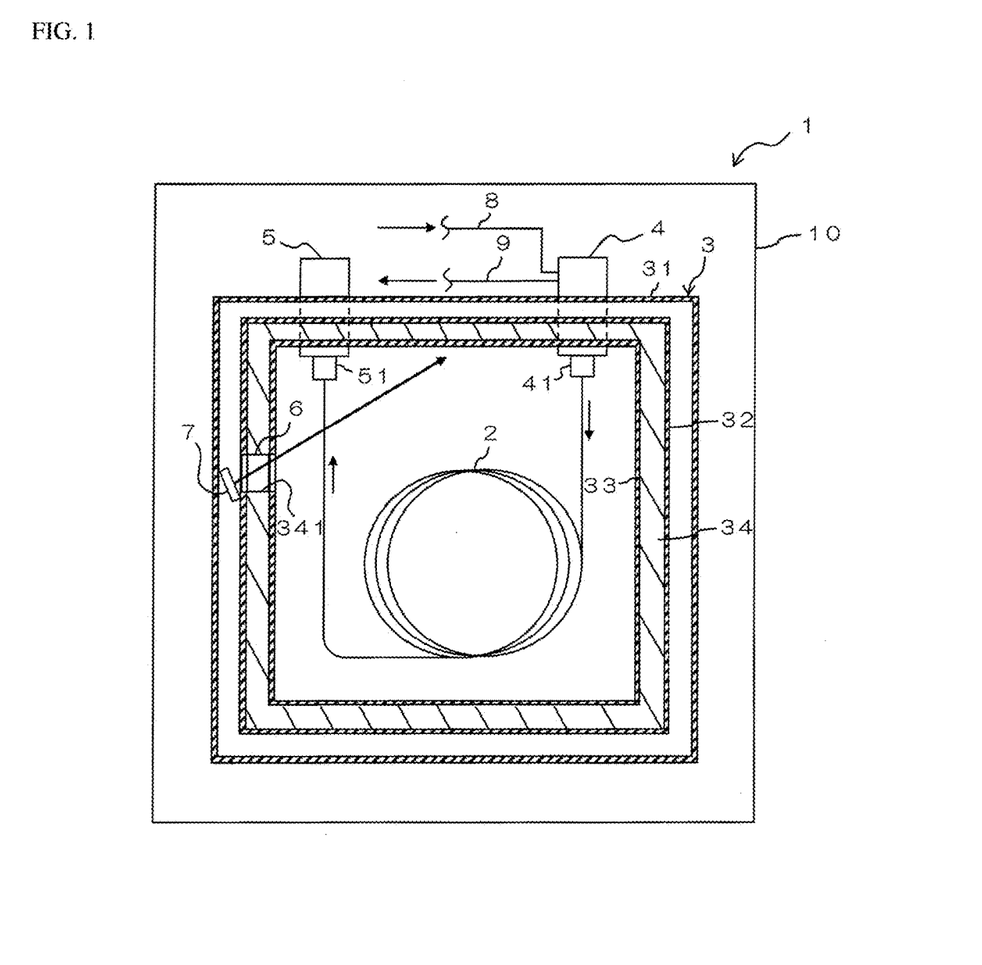
FIG. 1 is a schematic view illustrating a configuration example of a gas chromatograph according to one embodiment of the present invention.

FIG. 1 is a schematic view illustrating a configuration example of a gas chromatograph 1 according to one embodiment of the present invention.

The gas chromatograph 1 is configured to perform an analysis by supplying a sample gas into a column 2 together with a carrier gas. In addition to the column 2, the gas chromatograph 1 further includes a column oven 3, a sample introducing unit 4, a detector 5, a light-transmitting member 6, a light source 7, and the like. In the gas chromatograph 1, the above-described constituents are disposed in a housing 10.

The column 2 is configured of, for example, a capillary column. The column 2 is accommodated in the column oven 3 together with a heater, a fan, and the like (none of which are illustrated).

The column oven 3 is configured to heat the column 2, and appropriately drive the heater and the fan during an analysis. The column oven 3 includes an outer casing 31, a first inner casing 32, a second inner casing 33, and a heat insulator 34.

The outer casing 31 is formed in a box shape. The outer casing 31 forms the outer surface of the column oven 3.

The first inner casing 32 is formed in a box shape smaller than the outer casing 31 and is disposed in the outer casing 31.

The second inner casing 33 is formed in a box shape smaller than the first inner casing 32 and is disposed in the first inner casing 32. The first inner casing 32 and the second inner casing 33 constitute the inner casing of the column oven 3. That is, in the inner casing of the column oven 3, the first inner casing 32 is disposed on the outer side, and the second inner casing 33 is disposed on the inner side. The first inner casing 32 and the second inner casing 33 are disposed with a space therebetween.

The heat insulator 34 is disposed (interposed) between the first inner casing 32 and the second inner casing 33. The heat insulator 34 is formed in a box shape. An opening 341 penetrating the heat insulator 34 in the thickness direction is formed on a side wall of the heat insulator 34. The opening 341 is located on an optical path of light from the light source 7 to be described later. Although not illustrated, one end section of each of the heat insulator 34, the outer casing 31, the first inner casing 32, and the second inner casing 33 is opened. The inner space of the second inner casing (heat insulator 34) is formed as an opening section of the column oven 3.

The sample introducing unit 4 is provided in an upper part of the column oven 3. The lower end section of the sample introducing unit 4 protrudes downward from the upper surface of the second inner casing 33 of the column oven 3. The lower end section of the sample introducing unit 4 constitutes a first connecting section 41 to which one end of the column 2 is connected. The sample introducing unit 4 is configured to introduce a carrier gas and a sample gas into the column 2. A sample vaporizing chamber (not illustrated) is formed in the sample introducing unit 4. A liquid sample is injected in this sample vaporizing chamber, and a sample vaporized in the sample vaporizing chamber is introduced into the column 2 together with the carrier gas. A gas supply flow path 8 and a split flow path 9 communicate with the sample vaporizing chamber.

The gas supply flow path 8 is a flow path for supplying the carrier gas into the sample vaporizing chamber of the sample introducing unit 4.

The split flow path 9 is a flow path for discharging part of gas (mixed gas of the carrier gas and the sample gas) in the sample vaporizing chamber to the outside at a predetermined split ratio when the carrier gas and the sample gas are introduced into the column 2 by using a split injection method.

The detector 5 is provided in the upper part of the column oven 3 and is spaced away from the sample introducing unit 4. The lower end section of the detector 5 protrudes downward from the upper surface of the second inner casing 33 of the column oven 3. The lower end section of the detector 5 constitutes a second connecting section 51 to which the other end of the column 2 is connected. The detector 5 is configured of, for example, a flame ionization detector (FID) or a flame photometric detector (FPD). The detector 5 sequentially detects sample components contained in the carrier gas introduced from the column 2.

The light-transmitting member 6 is provided in the opening 341 formed in the heat insulator 34. The light-transmitting member 6 is configured to transmit light.

The light source 7 is provided in the column oven 3. Specifically, the light source 7 is provided in a space between the outer casing 31 and the first inner casing 32 (heat insulator 34) and is disposed in a position facing the light-transmitting member 6 in the horizontal direction.

In a case where a sample is measured in the gas chromatograph 1, first, the sample to be analyzed is injected into the sample introducing unit 4. The sample is vaporized in the sample vaporizing chamber. In addition, a carrier gas is supplied to the sample vaporizing chamber of the sample introducing unit 4 via the gas supply flow path 8.

The sample vaporized in the sample vaporizing chamber is introduced into the column 2 together with the carrier gas. Sample components contained in the sample are separated during when the sample passes through the column 2, and sequentially introduced into the detector 5.

Then, the detector 5 sequentially detects the sample components contained in the carrier gas introduced from the column 2. The gas chromatograph 1 generates a chromatogram according to a detection signal of the detector 5. A user checks the obtained chromatogram and performs various analyses.

In addition, in a case where an operator performs an operation in the column oven 3, such as in a case of performing maintenance in the column oven 3 in the gas chromatograph 1, the light source 7 emits light. Although not illustrated, the gas chromatograph 1 is provided with an opening and closing door for closing the opening section of the column oven 3. For example, the light source 7 emits light in accordance with operation of opening the opening and closing door. Light from the light source 7 is transmitted through the light-transmitting member 6, is introduced into the column oven 3, and illuminates the upper surface of the inside of the column oven 3 (second inner casing 33). Specifically, the light source 7 irradiates with light an area between the first connecting section 41 of the sample introducing unit 4 and the second connecting section 51 of the detector 5 on the upper surface of the second inner casing 33.

By illuminating the inside of the column oven 3 in this manner, the operator can perform an operation such as maintenance while easily viewing the inside of the column oven 3.

2. Detailed Configurations of Light-Transmitting Member and Light Source

Figure 2:
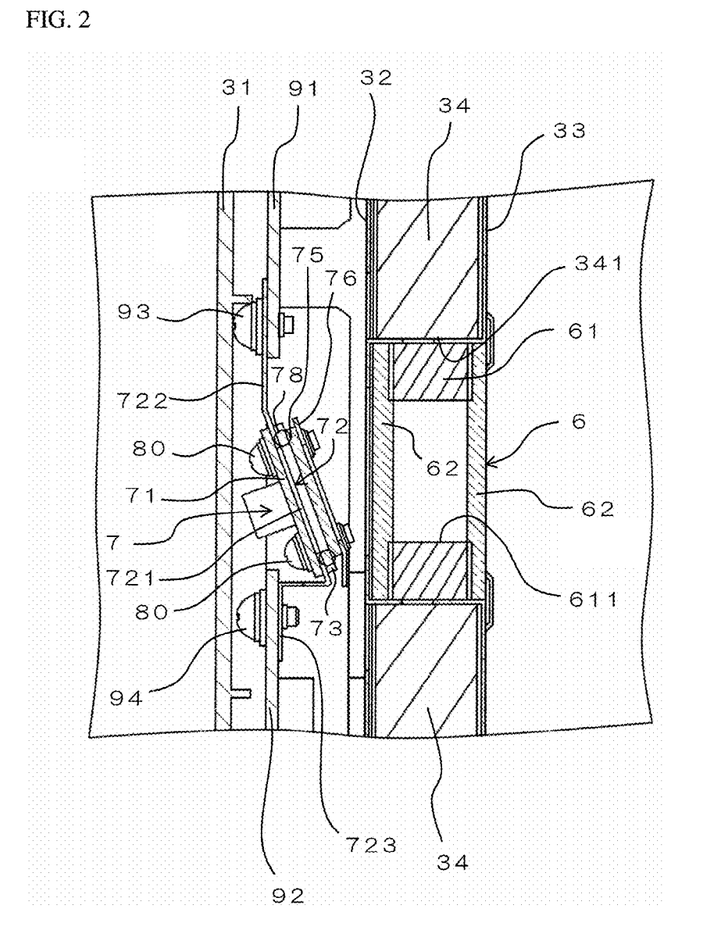
FIG. 2 is a cross-sectional view illustrating details of a light-transmitting member, a light source, and members around the light-transmitting member and the light source in the gas chromatograph.

FIG. 2 is a cross-sectional view illustrating details of the light-transmitting member 6, the light source 7, and members around the light-transmitting member 6 and the light source 7 in the gas chromatograph 1.

As described above, the light-transmitting member 6 is provided in the opening 341 formed in the heat insulator 34. The opening 341 is formed in a rectangular shape in side view and penetrates the side wall of the heat insulator 34 in the thickness direction. The light-transmitting member 6 is formed in a rectangular shape in side view. The light-transmitting member 6 includes a heat insulating member 61 and a pair of glass plates 62.

The heat insulating member 61 is formed in a rectangular shape in side view and has a predetermined thickness. The thickness of the heat insulating member 61 is slightly less than the thickness (depth) of the opening 341. The heat insulating member 61 is made of a material (heat insulating material) identical to the material of the heat insulator 34. A through hole 611 is formed in the heat insulating member 61. The through hole 611 has a circular shape in side view and penetrates the heat insulating member 61 in the thickness direction.

The pair of glass plates 62 are disposed on both sides of the heat insulating member 61 in the thickness direction. In other words, the pair of glass plates 62 sandwich the heat insulating member 61. The pair of glass plates 62 close the through hole 611. Each glass plate 62 is formed in a rectangular flat plate shape. In side view (in a state viewed in the thickness direction), the outer shape of each glass plate 62 is substantially identical to the outer shape of the heat insulating member 61. The through hole 611 of the heat insulating member 61 is closed by the pair of glass plates 62.

As described above, the light source 7 is provided in the space between the outer casing 31 and the first inner casing 32 (heat insulator 34). The light source 7 includes a substrate 71, a first sheet metal member 72, a spacer plate 73, a plurality of (four) spacer rings 74, a glass plate 75, and a second sheet metal member 76. In the light source 7, the above-described constituents are laminated.

Figure 3:
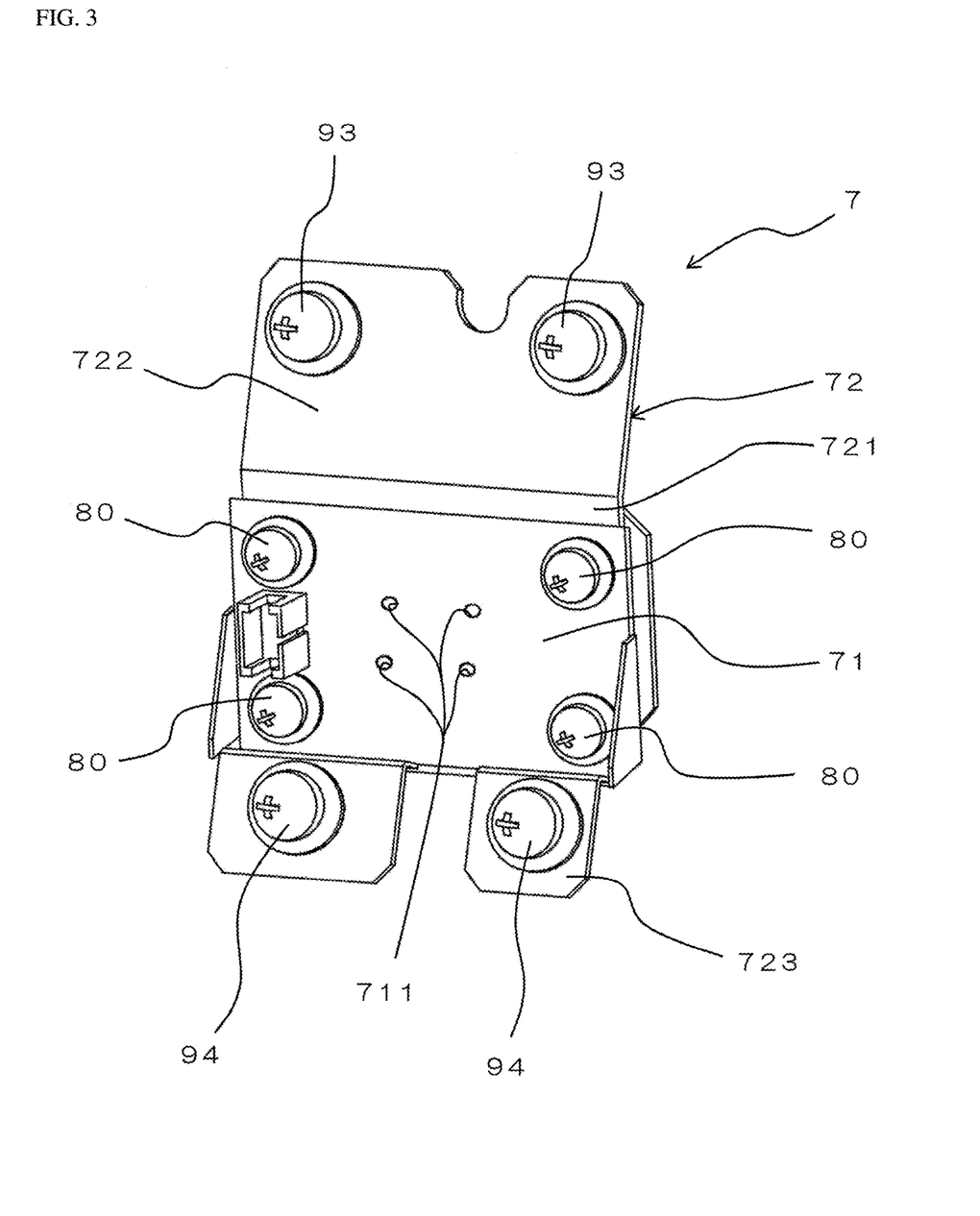
FIG. 3 is a perspective view illustrating the light source in FIG. 2 and illustrating a state as viewed from a substrate side.
Figure 4:
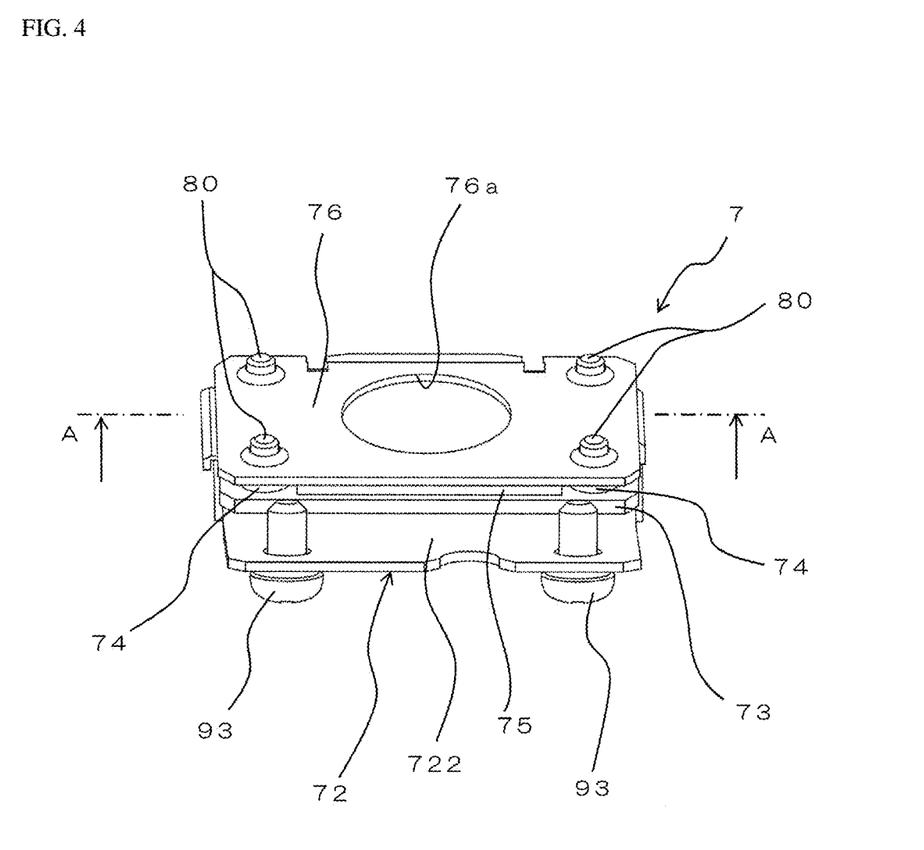
FIG. 4 is a perspective view illustrating the light source in FIG. 2 and illustrating a state as viewed from a second sheet metal-member side.
Figure 5:
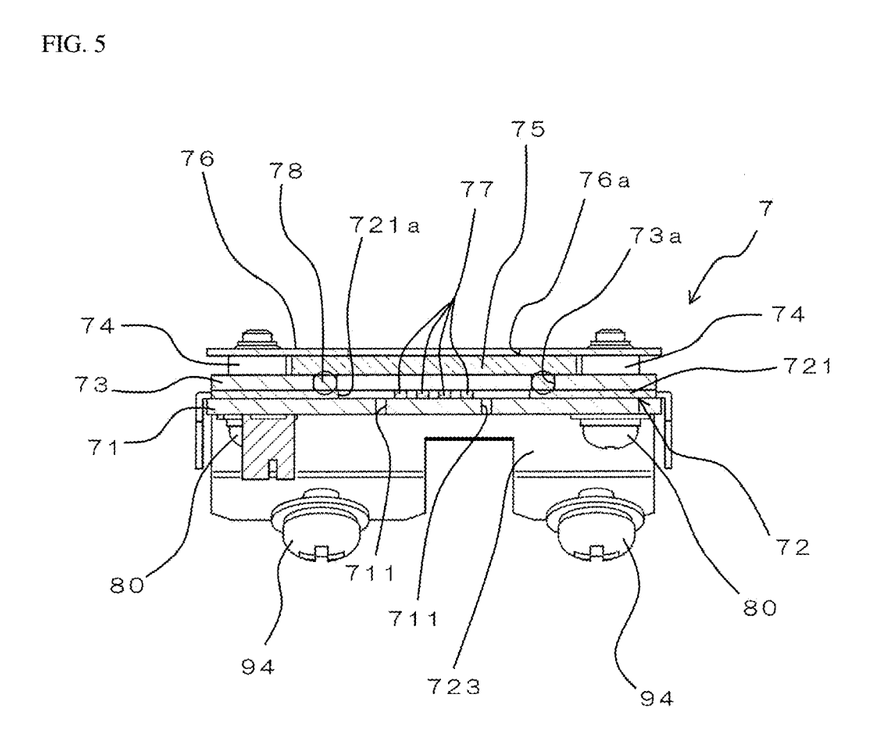
FIG. 5 is a cross-sectional view taken along line A-A in FIG. 4.

FIG. 3 is a perspective view illustrating the light source 7 and illustrating a state as viewed from a substrate 71 side. FIG. 4 is a perspective view illustrating the light source 7 and illustrating a state as viewed from a second sheet metal-member 76 side. FIG. 5 is a cross-sectional view taken along line A-A in FIG. 4.

The substrate 71 is formed in a rectangular flat plate shape and has a predetermined thickness. A plurality of (four) through holes 711 is formed in the central section of the substrate 71. Each through hole 711 penetrates the substrate 71 in the thickness direction. The plurality of (four) through holes 711 is spaced away from each other. As illustrated in FIG. 5, a plurality of light emitting elements 77 is mounted on the substrate 71.

The plurality of light emitting elements 77 is disposed in a central section of the surface of the substrate 71 on one side. Specifically, the plurality of light emitting elements 77 is disposed closer to the center on the substrate 71 than the plurality of through holes 711 is.

Note that the configuration of the light source 7 will be described below assuming that the side (upper side in FIG. 5) where the light emitting elements 77 are disposed with respect to the substrate 71 is referred to as one side in the thickness direction, and the side (lower side in FIG. 5) opposite to the side where the light emitting elements 77 are disposed with respect to the substrate 71 is referred to as the other side in the thickness direction.

As illustrated in FIGS. 2 and 3, the first sheet metal member 72 is disposed on the one side in the thickness direction with respect to the substrate 71. The first sheet metal member 72 is formed in a plate shape having a plurality of bent portions. The first sheet metal member 72 includes a lamination section 721, a first end section 722, and a second end section 723.

The lamination section 721 is formed in a flat plate shape. As illustrated in FIG. 5, an opening 721a is formed in the lamination section 721. The opening 721a has a circular shape when viewed in the thickness direction and penetrates the central section of the lamination section 721 in the thickness direction. In the opening 721a, the plurality of light emitting elements 77 mounted on the substrate 71 is disposed. The opening 721a communicates with the through holes 711 of the substrate 71.

As illustrated in FIGS. 2 and 3, the first end section 722 is formed in a flat plate shape and extends so as to bend from the lamination section 721.

The second end section 723 is formed in a plate shape bent in an L shape and extends from the lamination section 721 in a direction opposite to the direction in which the first end section 722 extends.

As illustrated in FIGS. 4 and 5, the spacer plate 73 is disposed on the one side in the thickness direction with respect to the first sheet metal member 72. The spacer plate 73 is formed in a rectangular flat plate shape. An opening 73a is formed in the spacer plate 73. The opening 73a has a circular shape when viewed in the thickness direction and penetrates the central section of the spacer plate 73 in the thickness direction. The diameter of the opening 73a of the spacer plate 73 is slightly larger than the diameter of the opening 721a of the first sheet metal member 72. The opening 73a of the spacer plate 73 communicates with the opening 721a of the first sheet metal member 72.

The plurality of spacer rings 74 is disposed on the one side in the thickness direction with respect to the spacer plate 73. Specifically, each spacer ring 74 is disposed on the one side in the thickness direction with respect to each corner portion of the spacer plate 73. Each spacer ring 74 is an annular member.

The glass plate 75 is disposed on the one side in the thickness direction with respect to the spacer plate 73. Specifically, the glass plate 75 is disposed on the one side in the thickness direction with respect to the central section of the spacer plate 73. In the thickness direction, the glass plate 75 is disposed in a position substantially identical to the position of each spacer ring 74. The glass plate 75 is formed in a rectangular flat plate shape. The thickness of the glass plate 75 is substantially identical to the thickness of each spacer ring 74.

An O-ring 78 is disposed between the glass plate 75 and the first sheet metal member 72. In other words, the O-ring 78 is disposed inside the opening 73a of the spacer plate 73.

The second sheet metal member 76 is disposed on the one side in the thickness direction with respect to the glass plate 75 and each spacer ring 74. The second sheet metal member 76 is formed in a rectangular flat plate shape. An opening 76a is formed in the second sheet metal member 76. The opening 76a has a circular shape when viewed in the thickness direction and penetrates the central section of the second sheet metal member 76 in the thickness direction.

Although not illustrated, a screw hole is formed in each corner portion of each of the substrate 71, the first sheet metal member 72, the spacer plate 73, the glass plate 75, and the second sheet metal member 76. A screw 80 is inserted into the screw holes communicating with one another in the thickness direction and the screw 80 is fastened, so that the substrate 71, the first sheet metal member 72, the spacer plate 73, the glass plate 75, and the second sheet metal member 76 are fixed. Thus, the light source 7 is configured. At that time, each screw 80 is inserted into the internal space of each spacer ring 74.

In a state where the light source 7 is configured as described above, the spacer rings 74 are disposed between the spacer plate 73 and the second sheet metal member 76. Therefore, pressing force greater than or equal to a certain level is prevented from being applied to the glass plate 75 from the spacer plate 73 and the second sheet metal member 76. In addition, since the spacer plate 73 is disposed between the first sheet metal member 72 and the glass plate 75, a space between the first sheet metal member 72 and the glass plate 75 is secured.

A space defined by the opening 73a of the spacer plate 73 and the opening 721a of the first sheet metal member 72 is formed between the substrate 71 and the glass plate 75. The plurality of light emitting elements 77 is disposed in this space. In addition, this space (the opening 73a of the spacer plate 73 and the opening 721a of the first sheet metal member 72) communicates with a space on the other side in the thickness direction of the substrate 71 (the lower side of the substrate 71) via the through holes 711 of the substrate 71.

3. Fixation of Light Source and Light Emission from Light Source

As illustrated in FIG. 2, in the gas chromatograph 1, a first heat transfer member 91 and a second heat transfer member 92 are provided between the outer casing 31 and the first inner casing 32. Each of the first heat transfer member 91 and the second heat transfer member 92 is formed in a flat plate shape. The first heat transfer member 91 and the second heat transfer member 92 are disposed with a space therebetween in the vertical direction. The first heat transfer member 91 is disposed on the upper side, and the second heat transfer member 92 is disposed on the lower side. Each of the first heat transfer member 91 and the second heat transfer member 92 is spaced away from and disposed in parallel to the outer casing 31. The area between the first heat transfer member 91 and the second heat transfer member 92 faces the light-transmitting member 6.

The first end section 722 of the first sheet metal member 72 is fixed to the first heat transfer member 91 with screws 93, and the second end section 723 of the first sheet metal member 72 is fixed to the second heat transfer member 92 with screws 94. Thus, the light source 7 is fixed and disposed in the space between the outer casing 31 and the first inner casing 32.

In this state, the light source 7 is spaced away from the light-transmitting member 6 in the horizontal direction. In addition, the substrate 71 of the light source 7 is slightly inclined with respect to the vertical direction.

When light is emitted from the light emitting element 77 mounted on the substrate 71, the light passes through the opening 73a of the spacer plate 73 and is transmitted through the glass plate 75. Then, the light passes through the opening 76a of the second sheet metal member 76 and is directed toward the light-transmitting member 6. Then, the light from the light source 7 (light emitting element 77) is transmitted through one of the glass plates 62 of the light-transmitting member 6, passes through the through hole 611, is transmitted through the other glass plate 62, and directed to the inside of the column oven 3. At that time, the light from the light source 7 (light emitting element 77) is emitted at an angle slightly inclined with respect to the vertical direction. Then, as illustrated in FIG. 1, the light from the light source 7 illuminates the area between the first connecting section 41 of the sample introducing unit 4 and the second connecting section 51 of the detector 5 on the upper surface of the second inner casing 33.

4. Heat Around Light Source

When an analysis is performed in the gas chromatograph 1, the inside of the column oven 3 becomes a high temperature state of 450° C., for example.

However, the inside of the column oven 3 and the area around the substrate 71 are insulated from each other by the pair of glass plates 62 and the glass plate 75. Therefore, convection is prevented from occurring between air inside the column oven 3 and air around the substrate 71. In addition, the glass plates 62 and the glass plate 75 have low thermal conductivity. Therefore, heat transfer from the inside of the column oven 3 to the substrate 71 is suppressed.

In addition, heat around the substrate 71 is transmitted to the first heat transfer member 91 and the second heat transfer member 92 via the first sheet metal member 72.

Furthermore, air between the substrate 71 and the glass plate 75 convects such that the air is exchanged with air on an outer casing 31 side via the through holes 711 of the substrate 71. Therefore, even in a case where the temperature of air between the substrate 71 and the glass plate 75 becomes high, the air can be exchanged with cooler air on the outer casing 31 side.

In this manner, it is possible to keep the area around the substrate 71 at a low temperature.

5. Operation and Effect (1) According to the present embodiment, as illustrated in FIG. 1, the first connecting section 41 in the sample introducing unit 4 and the second connecting section 51 in the detector 5 are provided in the upper part in the column oven 3 in the gas chromatograph 1. The light source 7 emits light toward the upper surface of the inside of the column oven 3 (second inner casing 33).

That is, light from the light source can be emitted toward the upper surface of the inside of the column oven 3 (second inner casing 33) where the first connecting section 41 in the sample introducing unit 4 and the second connecting section 51 in the detector 5 are provided and thus an operator frequently performs maintenance.

Therefore, work efficiency in the gas chromatograph 1 can be improved.

In addition, the light source 7 is provided in the column oven 3.

Therefore, since a space in which the light source 7 is disposed needs not to be secured outside the column oven 3, the size of the gas chromatograph 1 can be reduced.

As described above, the gas chromatograph 1 enables improvement of work efficiency and size reduction of the gas chromatograph 1.

(2) In addition, according to the present embodiment, as illustrated in FIG. 1, in the gas chromatograph 1, the light source 7 irradiates with light the area between the first connecting section 41 of the sample introducing unit 4 and the second connecting section 51 of the detector 5 on the upper surface of the inside of the column oven 3 (second inner casing 33).

That is, in the column oven 3, the first connecting section 41 in the sample introducing unit 4 and the second connecting section 51 in the detector 5 are irradiated with light from the light source 7.

Therefore, work efficiency in the gas chromatograph 1 can be further improved.

(3) In addition, according to the present embodiment, as illustrated in FIG. 1, the light source 7 is provided in the space between the outer casing 31 and the heat insulator 34 (first inner casing 32) in the gas chromatograph 1.

That is, in the gas chromatograph 1, the space between the outer casing 31 and the heat insulator 34 (first inner casing 32) in the column oven 3 can be used for disposing the light source 7 therein.

Therefore, it is possible to suppress an increase in size of the column oven 3.

In addition, the light source 7 is disposed outside the heat insulator 34.

Therefore, it is possible to suppress an increase in temperature of the light source 7 due to the influence of heat inside the column oven 3.

(4) In addition, according to the present embodiment, as illustrated in FIG. 2, a light-transmitting member 6 is provided in the opening 341 of the heat insulator 34 in the gas chromatograph 1. The light-transmitting member 6 transmits light from the light source 7.

Therefore, light from the light source 7 can be transmitted through the light-transmitting member 6 and directed to the inside of the column oven 3. In addition, the light-transmitting member 6 can suppress heat exchange between the inside of the column oven 3 and the outside of the heat insulator 34.

(5) In addition, according to the present embodiment, as illustrated in FIG. 2, in the gas chromatograph 1, the light-transmitting member 6 includes the heat insulating member 61 and the pair of glass plates 62. The through hole 611 is formed in the heat insulating member 61. The pair of glass plates 62 sandwich the heat insulating member 61 so as to close the through hole 611.

Therefore, light from the light source 7 can be transmitted through the pair of glass plates 62 and directed to the inside of the column oven 3. In addition, the pair of glass plates 62 and the heat insulating member 61 can suppress heat exchange between the inside of the column oven 3 and the outside of the heat insulator 34.

(6) In addition, according to the present embodiment, as illustrated in FIG. 5, in the gas chromatograph 1, the light emitting elements 77 are disposed in the space between the substrate 71 and the glass plate 75.

Therefore, the space between the substrate 71 and the glass plate 75 can be used for disposing the light emitting elements 77 therein.

In addition, light from the light emitting element 77 can be transmitted through the glass plate 75 and directed to the inside of the column oven 3. Furthermore, the glass plate 75 can suppress heat exchange between the area around the light emitting elements 77 and the external area (area on the one side in the thickness direction of the glass plate 75).

(7) In addition, according to the present embodiment, as illustrated in FIG. 5, in the gas chromatograph 1, the first sheet metal member 72 is provided between the substrate 71 and the glass plate 75. The first sheet metal member 72 is in contact with the first heat transfer member 91 and the second heat transfer member 92 provided in the column oven 3.

Therefore, heat around the substrate 71 can be transmitted to the first heat transfer member 91 and the second heat transfer member 92 via the substrate 71.

As a result, it is possible to suppress an increase in temperature of the periphery of the substrate 71.

(8) In addition, according to the present embodiment, as illustrated in FIG. 3, the plurality of through holes 711 is formed in the substrate 71. The through holes 711 of the substrate 71 communicate with the space formed between the substrate 71 and the glass plate 75.

Therefore, it is possible to convect air between the substrate 71 and the glass plate 75 such that the air is exchanged with air on the outer casing 31 side via the through holes 711 of the substrate 71.

As a result, even in a case where the temperature of air between the substrate 71 and the glass plate 75 becomes high, the air can be exchanged with cooler air on the outer casing 31 side.

Therefore, it is possible to further suppress an increase in temperature of the periphery of the substrate 71.

What is claimed is:

1. A gas chromatograph comprising:
   a housing;
   a column oven which accommodates a column inside;
   a sample introducing unit which includes a first connecting section connected to one end of the column, the first connecting section being provided at an upper part in the column oven;
   a detector which includes a second connecting section connected to another end of the column, the second connecting section being provided at the upper part in the column oven; and
   a light source which is provided in the column oven and emits light to an upper surface of an inside of the column oven,
   wherein the light source is provided in a space between an outer casing and an inner casing of the column oven, which forms an inner surface of the column oven,
   wherein the column oven, the sample introducing unit and the detector are disposed in the housing,
   wherein the column oven includes a heat insulator which is provided inside the outer casing, and
   wherein the light source is angled at an incline with respect to a vertical direction of the gas chromatograph, such that the light emitted can illuminate an area between the first connection section and the second connection section.

2. The gas chromatograph according to claim 1, wherein the light source emits light toward an area between the first connecting section and the second connecting section on the upper surface of the inside of the column oven.

3. The gas chromatograph according to claim 1, wherein the column oven includes the outer casing which has a box shape and forms an outer surface of the column oven, and the heat insulator which is provided inside the outer casing, and the light source is provided in a space between the outer casing and the heat insulator.

4. The gas chromatograph according to claim 3, wherein in the heat insulator, an opening is formed on an optical path of light from the light source, and
   a light-transmitting member which transmits light from the light source is provided in the opening.

5. The gas chromatograph according to claim 4, wherein the light-transmitting member includes a heat insulating member which has a through hole, and a pair of glass plates which sandwich the heat insulating member so as to close the through hole.

6. The gas chromatograph according to claim 1, wherein the light source includes a light emitting element, a substrate that has a mounting surface on which the light emitting element is mounted, and a glass plate that is provided so as to face the mounting surface, and
   the light emitting element is disposed in a space formed between the substrate and the glass plate.

7. The gas chromatograph according to claim 6 further comprising a sheet metal member provided between the substrate and the glass plate,
   wherein the sheet metal member is in contact with a heat transfer member provided in the column oven.

8. The gas chromatograph according to claim 6, wherein a through hole is formed in the substrate, the through hole communicating with the space formed between the substrate and the glass plate.

9. The gas chromatograph according to claim 1, wherein a part of the detector and a part of the sample introducing unit extend outside of an outer casing of the column oven.

10. The gas chromatograph according to claim 1, wherein the inner casing includes a first inner casing and a second inner casing, and the heat insulator is disposed between the first inner casing and the second inner casing.

* * * * *